3,111,079
COFFEE-POTS OF THE PRESSURE TYPE
Henri Lescure, Selongey, Cote d'Or, France
Filed June 12, 1961, Ser. No. 116,794
Claims priority, application France July 8, 1960
8 Claims. (Cl. 99—293)

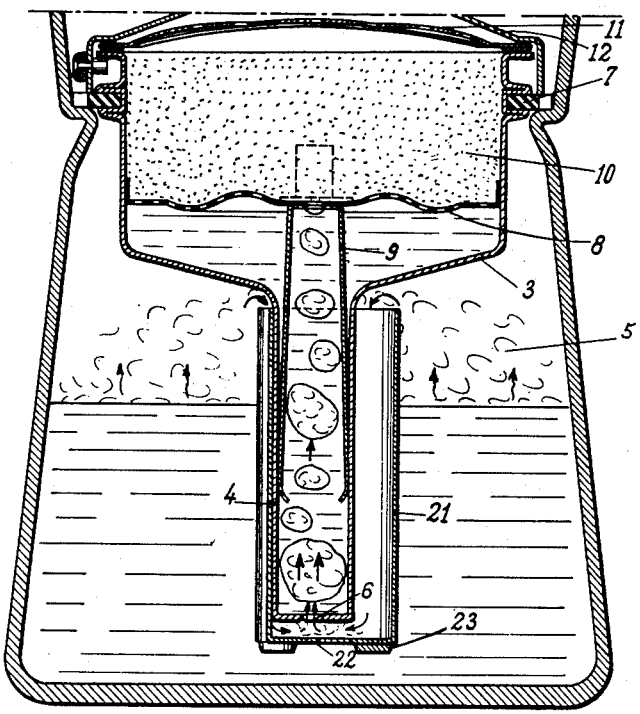
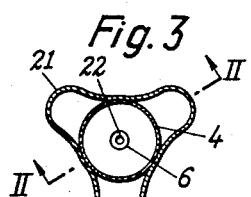
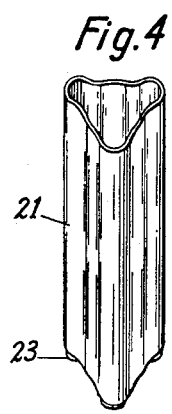
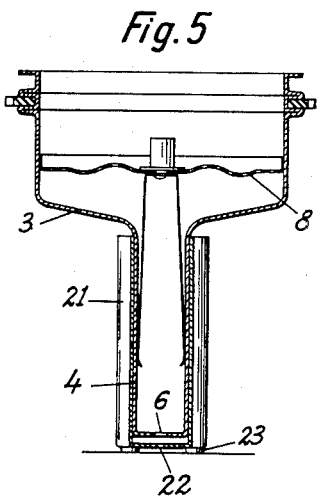
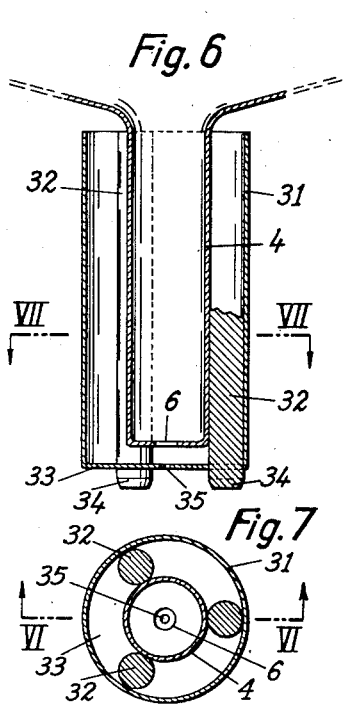
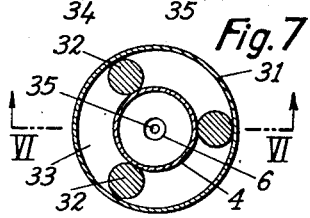

The invention has for its object improvements made in coffee-pots of the pressure type. It relates especially to those coffee-pots in which the basin containing the ground coffee is provided near its bottom with a pipe for the purpose of conveying water to the basin. The pipe opens into a fluid-tight chamber intended to contain water which, under the effect of heating, rises inside the pipe and passes through the ground coffee and becomes charged with coffee.

In accordance with the invention, a tubular casing is disposed around this water adducing pipe while free passages are formed between the tubular casing and the pipe. The casing is provided at its bottom portion with an opening which permits the water to enter and which is substantially smaller than the inlet orifice of the adducing pipe.

Owing to this arrangement, hot water and steam reach the basin in alternate succession, thereby considerably improving the quality of the infusion obtained.

The accompanying drawings illustrate, by way of example, a form of execution of a coffee-pot of the pressure type endowed with the improvements forming the object of the present invention.

FIG. 2 is a partial vertical cross-section taken along the line II—II of FIG. 3 showing the operation after the formation of steam inside the fluid-tight chamber.

FIG. 3 is a cross-section taken along the line III—III of FIG. 1.

FIG. 4 is a view in perspective of the tubular casing.

FIG. 5 shows the manner in which the tubular casing in accordance with the invention is to be used for the purpose of carrying out the filling of the ground coffee basin under good conditions.

FIG. 6 is a sectional view in elevation taken along VI—VI of FIG. 7 of another embodiment according to the invention, the part of the coffee-pot represented being limited to the water adducing pipe.

FIG. 7 is a cross section taken along the line VII—VII of FIG. 6.

Figure 1:
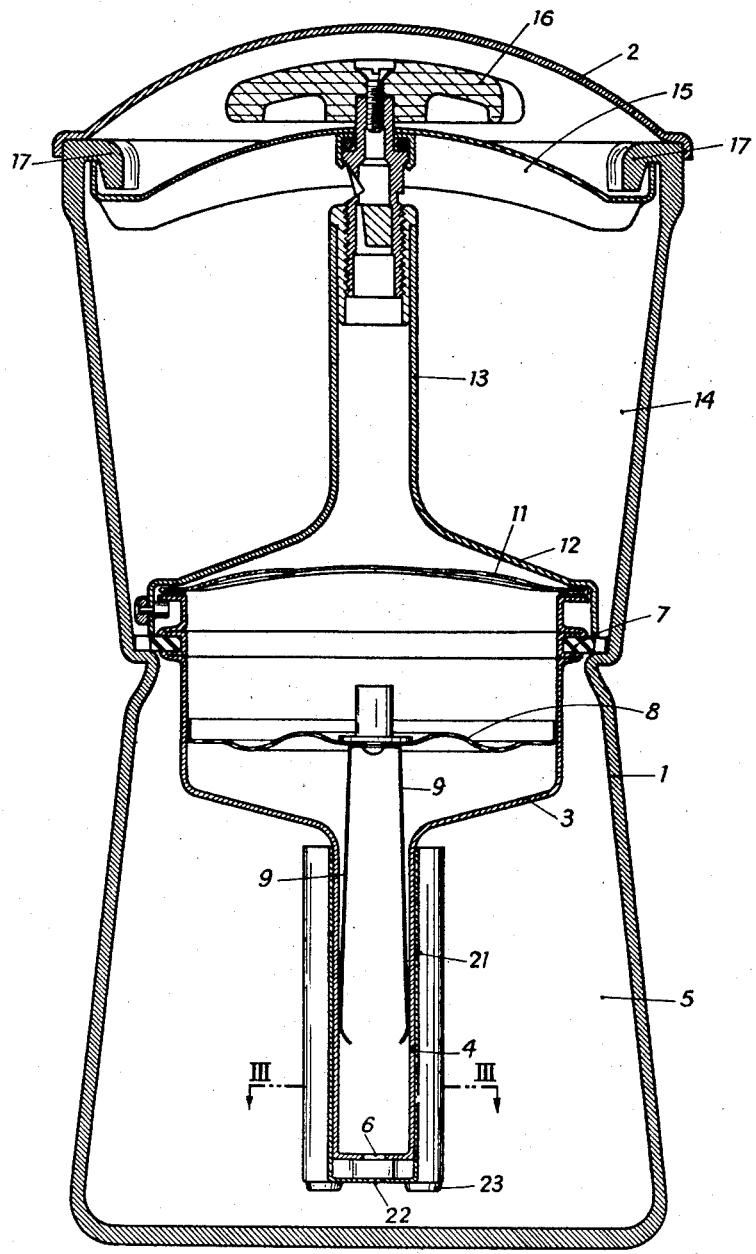
FIG. 1 is a vertical cross-section of the complete apparatus.

The coffee-pot shown by way of example in FIG. 1 is in conformity as far as its broad structure is concerned with my previous U.S. Patent No. 3,044,388.

In this figure, there can be seen at 1 the body of the coffee-pot with its lid 2 and at 3 the ground coffee basin with its pipe 4 for adducing water contained inside the fluid-tight chamber 5, the pipe 4 having an inlet orifice 6. The basin 3 is fitted externally with a sealing joint 7 which closes off the chamber 5. This basin contains a detachable screen 8 supported by two elastic arms 9 engaged inside the pipe 4. The screen 8, which is also adjustable in height, supports the ground coffee and is surmounted by the top screen 11 and by the basin cover 12. Cover 12 forms a single piece with the outlet pipe 13 located inside the top chamber 14, which is intended to receive the infusion produced. The pipe 13 is coupled to a cross-piece 15 with a possibility of adjustment provided by means of an operating knob 16 and this cross-piece is applied against ears 17 formed internally on the body 1.

In accordance with the present invention, the device having the structure above referred to is completed by a tubular casing 21 which is adapted so as to fit tightly over the pipe 4. An orifice 22 is provided at the bottom of the casing 21. This orifice, which is intended for the admittance of water into said casing, has substantially a flow-section which is distinctly smaller than that of the inlet orifice 6 of the pipe 4. By way of non-limitative example, the area of the orifice 22 of the casing 21 can be in the vicinity of one quarter of the area of the orifice 6 of the pipe 4. Preferably it is also provided that the axial distance between the orifices 6 and 22 is substantially comprised between 3 and 12 mm.

In the form of embodiment which is illustrated in FIGS. 1–5, the casing 21 comprises a tube having a section which has substantially the shape of a triangle with rounded angles, and is applied at the central portion of each side against the water adducing pipe 4. There are thus formed between the pipe and the tubular casing three vertical passageways which communicate with the space comprised between the extremity of the pipe 4 and the bottom of the casing 21.

The tubular casing 21 is preferably provided at its bottom portion with shoes 23 so that this casing 21 is capable of standing upright by itself when separated from the pipe 4.

The operation of the coffee-pot as thus constituted takes place as follows:

The basin 3 being filled with ground coffee 10 and the fluid-tight chamber 5 containing water in suitable quantity, the coffee-pot is placed on the fire. The water inside the chamber 5 is heated and when a portion of this water is transformed into steam, the pressure of this steam acts on the water which is imprisoned between the tubular casing 21 and the pipe 4. This water flows through the orifice 6, rises inside the pipe 4, then passes through the ground coffee 10 contained in the basin 3 in which the water becomes charged with coffee, and the infused liquid rises inside the outlet pipe 13, then overflows into the top chamber 14.

Since the cross section of the inlet orifice 22 of the casing 21 through which water is supplied from chamber 5 thereto is substantially smaller than the cross section of orifice 6 at the inlet of the pipe 4, when the steam pressure in the chamber 5 has forced all the water housed between the casing 21 and the pipe 4 into the orifice 6 thereof, a certain time interval must pass before this casing again becomes filled with water supplied by orifice 22. During this time interval, steam is freely delivered from the casing 21 into the pipe 4 through the orifice 6. This steam ascends the pipe 4 to the ground coffee 10 and passes therethrough.

After a few seconds the water discharged by orifice 22 again reaches the level of the orifice 6, intercepting the passageway to the steam. This amount of water is then pushed into the pipe 4 and passes in turn through the ground coffee 10. This latter thus receives water and steam in alternate succession. The arrows appearing in FIG. 2 indicate the path traversed by steam generated within chamber 5. The steam enters casing 21 at its upper end, as shown by FIG. 2, and after forcing the water therein into pipe 4, the steam enters this pipe via orifice 6.

A series of tests has demonstrated that this alternate flow of water and of steam through the ground coffee makes it possible to extract the aroma of the coffee with far greater efficiency than if hot water alone had circulated through the ground coffee while preserving the aroma thereof.

Furthermore, if the coffee-pot were not provided with the tubular casing 21 surrounding the adducing pipe 4 in accordance with the invention, the pressure existing inside the fluid-tight chamber 5 into which the pipe projects could reach a relatively high value, 2 kg./cm.$^2$ for example. Consequently, the temperature of the boiling water in the chamber 5 would rise above 100° C. In that case the heat transferred by the walls of the coffee-pot to the top chamber 14 would be important enough to bring the infused liquid collected by said chamber up to the boiling point. The quality of the coffee being prepared would thus be damaged.

On the contrary, this detrimental effect may be completely avoided by the device according to the invention for the following reason:

In the periods when the lower part of the tubular casing 21 is evacuated by liquid water, the flow of steam through the pipe 4 causes the pressure within chamber 5 to substantially drop, so that the pressure in said chamber does not practically rise much above the atmospheric pressure. Consequently, the temperature of boiling water in the chamber 5 is substantially kept at 100° C. and this does not allow an ebullition of the water having coffee infused therein housed in the top chamber 14.

The tubular casing 21 provided by the invention has thus the double function of enabling steam to infuse the ground coffee and of preventing any overheating of the collected coffee. Any danger of boiling of the beverage produced is accordingly eliminated and consequently no supervision is necessary on the part of the user.

By placing the tubular casing 21 on a table, it is possible, as shown in FIG. 5, to use it as a support for the basin 3 in order to carry out the filling thereof prior to putting it in position inside the coffee-pot. When resting on the shoes 23, the tubular casing offers a broad base and constitutes a stable support for the ground coffee basin 3 at the time of filling of this latter.

It must be understood that the invention is not limited to that form of execution which is illustrated in the drawings and that any modifications of construction can be made therein. In the embodiment of FIGS. 6 and 7 the removable casing 31 to be disposed around the pipe 4 has a circular cross section, and is provided with rods 32 which come into contact with the pipe 4 and provide the necessary spacing. The rods 32 extend down through the bottom 33 of the casing 31 and project therefrom so as to constitute shoes 34. The bottom 33 is pierced by an orifice 35 analogous to orifice 22 of FIG. 2. The area of orifice 35 is about one fourth of that of orifice 6, as before. The operation is the same as that explained above. Moreover, although there has been illustrated in the drawings a coffee-pot in accordance with my Patent No. 3,044,388, hereinbefore referred to, the invention can be applied to any pressure type coffee-pot employing a pipe located beneath the ground coffee basin for adducing water.

What I claim is:

1. In a pressure coffee-pot comprising a boiler for water having a bottom adapted to be heated and an aperture opposite thereto, a ground coffee basin removably and water-tightly fitted in said boiler aperture, said basin having an adducing pipe projecting therefrom and housed in said boiler, said pipe having an extremity facing said boiler bottom, an orifice of definite flow section provided in said pipe extremity and means for collecting the coffee infusion issuing from said coffee basin when said coffee-pot is operated, means for improving the quality of the infused coffee, said means comprising a tubular casing fitted around said adducing pipe, said casing having an extremity arranged around said pipe extremity and an inlet orifice provided therein, the flow section of said casing inlet orifice being substantially smaller than that of the orifice in said pipe extremity, and passageways located between the outer surface of said pipe and said casing, said passageways communicating directly with said orifices.

2. A pressure coffee-pot comprising a boiler for water having a bottom adapted to be heated and an aperture opposite thereto, a top chamber projecting from said aperture oppositely to said boiler, a ground coffee basin removably and tightly secured on said aperture and partially extending into said top chamber, said basin having an adducing pipe projecting into said boiler and a discharge pipe projecting into said top chamber, said adducing pipe having an extremity facing said boiler bottom, an orifice of definite flow section provided in said pipe extremity, a tubular casing fitted around said adducing pipe with free passageways therebetween, said casing having an extremity arranged between said adducing pipe extremity and said boiler bottom, at least one inlet orifice provided into said casing extremity, the flow section of said casing orifice being substantially smaller than that of said pipe orifice and means to ensure a communication between said passageways within said casing and the interior of said boiler in a position remote from said boiler bottom and above the surface of the water within said boiler.

3. A pressure coffee-pot according to claim 4 wherein the ratio of the casing orifice area to the pipe orifice area is substantially one fourth.

4. A pressure coffee-pot according to claim 2, further comprising means for removably fitting said casing on said ground coffee basin adducing pipe.

5. A pressure coffee-pot according to claim 4 wherein said casing fitting means comprises resilient means to frictionally engage said adducing pipe.

6. A pressure coffee-pot according to claim 2 wherein said adducing pipe has a circular cross section and said tubular casing has an undulated cross section, with the inner diameter of said tubular casing corresponding to the outer diameter of said adducing pipe.

7. A pressure coffee-pot according to claim 2 wherein said tubular casing extremity is provided with shoes projecting therefrom towards said boiler bottom.

8. A pressure coffee-pot comprising a boiler for water having a bottom adapted to be heated and an aperture opposite thereto, a top chamber projecting from said aperture oppositely to said boiler, a ground coffee basin removably and tightly secured on said aperture and partially housed within said top chamber, said basin having an adducing pipe projecting into said boiler and a discharge pipe projecting into said top chamber, the lower end of said adducing pipe being closed by a wall facing said boiler bottom, an orifice of definite flow section provided in said wall, a tubular casing fitted around said adducing pipe and having at one extremity thereof a wall disposed between said pipe wall and said boiler bottom, an orifice provided in said casing wall, the flow section of said casing wall orifice being substantially smaller than that of said pipe orifice, free passageways provided between said casing and said pipe orifice, and means to ensure a communication between said passageways and the interior of said boiler in the vicinity of said ground coffee basin.

References Cited in the file of this patent
FOREIGN PATENTS
6,362     Great Britain _____ Jan. 11, 1833